May 26, 1970 G. LUGLI ET AL 3,513,898
TIRE BREAKER OF METALLIC CORDS
Filed Jan. 24, 1968
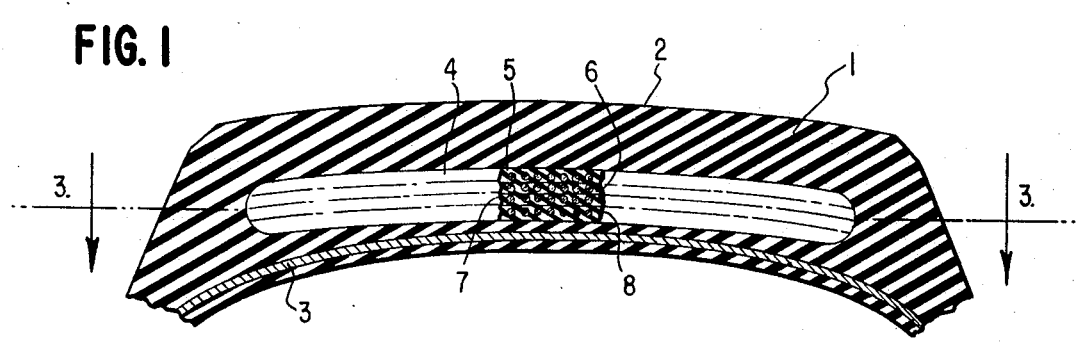
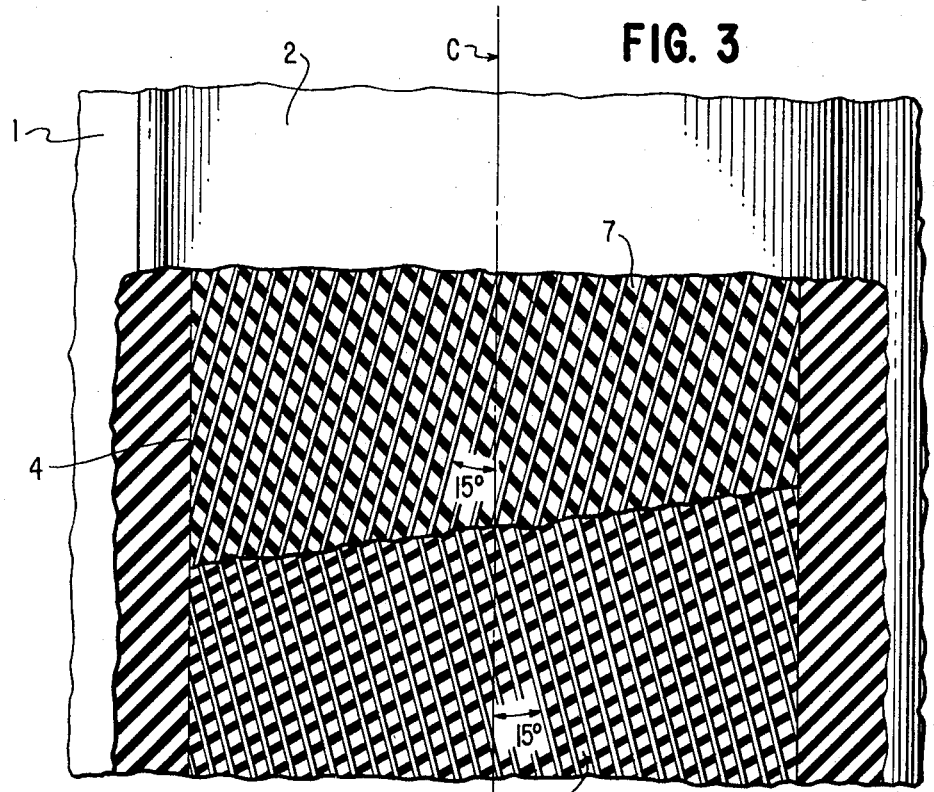
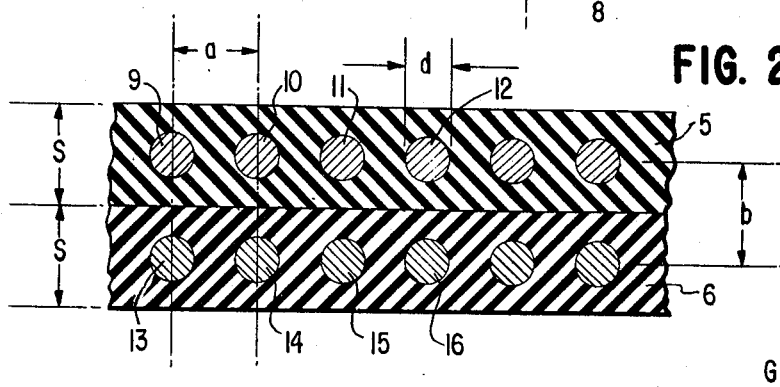
INVENTORS.
GIUSEPPE LUGLI,
LUIGI MAIOCCHI
BY *Stevens, Davis, Miller & Mosher*
ATTORNEYS

United States Patent Office 3,513,898
Patented May 26, 1970

3,513,898
TIRE BREAKER OF METALLIC CORDS
Giuseppe Lugli and Luigi Maiocchi, Milan, Italy, assignors to Pirelli S.p.A., Milan, Italy
Filed Jan. 24, 1968, Ser. No. 700,254
Claims priority, application Italy, Feb. 8, 1967, 12,401/67
Int. Cl. B60c 9/20
U.S. Cl. 152—361        4 Claims

ABSTRACT OF THE DISCLOSURE

A pneumatic tire having a metallic breaker formed by a plurality of strips of rubberized fabric, each strip including a plurality of metallic cords parallel to one another and inclined with respect to the circumferential midline of the breaker.

BACKGROUND OF THE INVENTION

Field of the invention

The present invention relates to pneumatic tires for vehicle wheels, which are especially suited for travel on irregular and unusual surfaces such as surface pits, building yards, etc.

Prior art

It is generally known to provide pneumatic tires with a radial carcass and with an annular structure disposed between the carcass and the tread for the purpose of stiffening the latter. In pneumatic tires for large vehicles, this annular structure usually consists of several layers of rubberized metal fabric formed by cords parallel to one another, the cords of the various layers being disposed along two or more directions crossed with respect to the circumferential midline of the tread. For the purpose of the present application, this annular structure will be referred to as a "metallic breaker."

The main disadvantage that arises in the use of pneumatic tires provided with a metallic breaker, is the excessive stiffness of the latter. This stiffness causes rupture of the breaker, especially when the tire is used on irregular ground, since the irregularities causes the breaker to bend suddenly with very small bending radii, thus giving rise to very strong inner stresses.

SUMMARY OF THE INVENTION

It is therefore an object of the present invention to provide a pneumatic tire having a metallic breaker with good flexibility characteristics and thus greater resistance to impacts, resulting in increased life of the tire and improved comfort to the driver of the vehicle.

Briefly summarized, the pneumatic tire of the present invention includes a breaker consisting of two or more superposed strips of rubberized fabric, each strip being formed by a plurality of metallic cords parallel to one another and inclined with respect to the circumferential midline of the breaker, the cords of at least one of said strips having an inclination opposite to those of at least one of the other strips, the midlines of two adjacent cords in each strip having a diameter $d$ being spaced from one another a distance $a$ comprised between approximately $1.75d$ and approximately $2.4d$, and the ratio $a/b$ being between approximately 0.82 and approximately 1.20, $b$ being the distance between the surface defined by the axes of the cords of one strip and the surface defined by the axes of the cords of an adjacent strip.

BRIEF DESCRIPTION OF THE DRAWINGS

The invention will now be better described with reference to the attached drawings, given by way of non-limiting example, in which:

FIG. 1 is a diagrammatic view, partially in section of a pneumatic tire in accordance with the present invention;
FIG. 2 represents a cross-sectional view of the metallic breaker of the pneumatic tire shown in FIG. 1; and
FIG. 3 is a cross-sectional view taken along line 3—3 of FIG. 1.

DESCRIPTION OF THE PREFERRED EMBODIMENTS

Referring specifically to the drawings, FIG. 1 illustrates a pneumatic tire, which may be of any known size, such as 10.00–20, for example. The tread 2 and carcass 3 are indicated diagrammatically, the latter being formed by six rayon plies 1650 x 2, the cords of which lie in substantially radial planes and are inclined at an angle of approximately 90° with respect to the circumferential midline of the tread.

A metallic breaker 4, formed by four strips of rubberized metallic fabric 5, 6, 7, and 8, is inserted between the tread 2 and the carcass 3. A plurality of steel cords are disposed in each of the strips and extend along two directions symmetrically inclined at an angle of approximately 15° with respect to the circumferential midline C of the breaker. For the sake of simplicity, the cords of the strips 5, 6, 7, and 8 are illustrated in FIG. 1 only in the central portion in proximity to the circumferential midline C, it being understood that these cords extend for the entire width of the strips.

FIG. 2 depicts, in detail, the steel cords associated with strips 5 and 6. The strip 5 is sectioned along a plane which is perpendicular to its cords 9, 10, 11, and 12, and the latter are inclined approximately 15° with respect to the circumferential midline C of the breaker. The strip 6 is sectioned along a plane perpendicular to its cords 13, 14, 15, and 16 and the latter are also inclined approximately 15° with respect to the circumferential midline C, but extend in an opposite direction to the cords associated with strip 5 as better shown in FIG. 3.

In general, the midlines of two adjacent cords having a diameter $d$ are spaced from one another a distance $a$, measured perpendicular to the cords, between approximately $1.75d$ and approximately $2.40d$ and the ratio $a/b$ is between approximately 0.82 and approximately 1.20, $b$ being the distance between the surface defined by the axes of the cords of one strip and the surface defined by the axes of the cords of the adjacent strip.

As a specific example of the above, the cords 9, 10, 11, and 12 of strip 5, and the cords 13, 14, 15, and 16 of strip 6 all have a diameter $d$ equal to 1.10 mm., and the distance $a$ between two adjacent cords of each strip is equal to 2.10 mm., which is equal to $1.91d$. Also, the distance $b$ between the surface defined by the axes of the cords 9, 10, 11, and 12, and the surface defined by the axes of the cords 13, 14, 15, and 16 is equal to 2.40 mm., so that the ratio $a/b$ is equal to 0.875.

Since the thicknesses of the strips 5 and 6 are equal in the specific case illustrated in FIG. 2, and since the cords of each strip are disposed in the central portion between the two surfaces of the strip, the distance $b$ is equal to the thickness $s$ of the strip.

To demonstrate the advantages of the pneumatic tire of the present invention, a set of tires substantially similar to the tire described in the example illustrated in FIGS. 1 and 2 was manufactured, along with a second set of tires similar to those tires, but having a metallic breaker of conventioned fabric, so that the distance $a$ defined above was equal to $1.35d$, and the ratio $a/b$ was equal to 0.77.

The two sets of tires were then fitted, one after the other, on a truck which was driven over a good asphalt paved road having fixed sharp stones projecting therefrom for 6% of its length, the stones extending for 15 cm. and being spaced in all directions for 20 cm.

As a result of the above, the tires according to the present invention lasted, on the average, for 3200 km. before the rupture of the metallic breaker, while the average life of the tires manufactured with a conventional metallic fabric was 1500 km. The improvement obtained by means of the present invention is therefore of the order of 100% with respect to the life of the conventional tires, and is probably due to the ability of the cords of the former to slightly vary their mutual position in response to the tire engaging irregular surface.

Although the present invention may be applied to any type of breaker or even to the reinforcing armour of the tread rings of removable tread tires, it is particularly useful when applied to pneumatic tires in which the metallic breaker is inextensible in the circumferential direction and is placed under tension by the inflation pressure of the tire. In each case, metallic breakers are generally formed by cords inclined only at a small angle, for instance smaller than 20° with respect to the circumferential midline of the breaker.

It is understood that the above-reported examples have not a limiting character and that the present invention can include alternative embodiments deriving from the above-indicated inventive principle. In particular, it is understood that the invention, which is described with particular reference to the metallic breakers, can also be applied to metallic carcasses whenever desired.

We claim:

1. A pneumatic tire for vehicle wheels having a breaker comprising at least two superposed strips of rubberized fabric, each strip including a plurality of metallic cords parallel to one another and inclined with respect to the circumferential midline of said breaker, the cords of at least one of said strips being oppositely inclined to those of at least one of the other strips, the midlines of two adjacent cords in each strip having a diameter $d$ being spaced from one another a distance $a$ comprised between approximately $1.75d$ and approximately $2.4d$, and the ratio $a/b$ being between approximately 0.82 and approximately 1.20, $b$ being the distance between the surface defined by the axes of the cords of one strip and the surface defined by the axes of the cords of an adjacent strip.

2. A pneumatic tire as in claim 1, characterized in that the distance $a$ is approximately equal to $1.9d$.

3. A pneumatic tire as in claim 1, characterized in that the ratio $a/b$ is approximately equal to 0.875.

4. In a pneumatic tire for vehicles having a carcass and a tread, the improvement comprising an annular structure disposed between the carcass and the tread, said annular structure including a plurality of strips of rubberized fabric, each strip including a plurality of metallic cords parallel to one another and inclined with respect to the circumferential midline of said annular structure, the cords of at least one of said strips being oppositely inclined to those of at least one of the other strips, the ratio of the distance between the midlines of two adjacent cords in each strip, and the distance between the surface defined by the axes of the cords of one strip and the surface defined by the axes of the cords of an adjacent strip, being approximately 0.82 and approximately 1.20.

References Cited

UNITED STATES PATENTS

| | | | |
|---|---|---|---|
| 2,235,867 | 3/1941 | Castricum et al. | 152—359 |
| 2,782,830 | 2/1957 | Wallace | 152—361 |

ARTHUR L. LA POINT, Primary Examiner

C. B. LYON, Assistant Examiner

PO-1050
(5/69)

UNITED STATES PATENT OFFICE
CERTIFICATE OF CORRECTION

Patent No. 3,513,898          Dated    May 26, 1970

Inventor(s)    Giuseppe LUGLI and Luigi MAIOCCHI

It is certified that error appears in the above-identified patent and that said Letters Patent are hereby corrected as shown below:

Column 2, line 67, change "conventioned" to -- conventional --

Column 4, claim 4, line 26, insert -- between -- after "being"

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents